Figure 1:
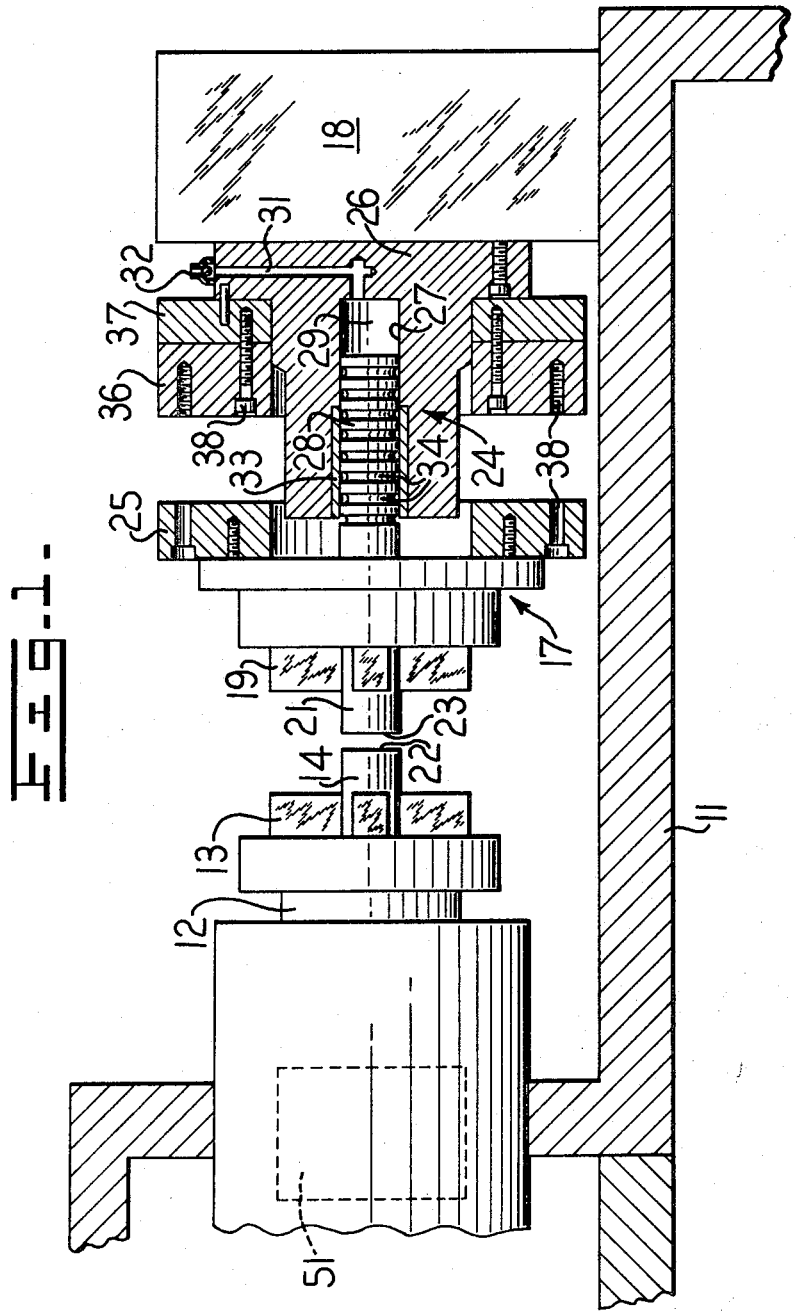

United States Patent
Loyd

[15] 3,694,896
[45] Oct. 3, 1972

[54] METHOD OF FRICTION WELDING
[72] Inventor: Calvin D. Loyd, Peoria, Ill.
[73] Assignee: Caterpillar Tractor Co., Peoria, Ill.
[22] Filed: Oct. 26, 1970
[21] Appl. No.: 84,140

Related U.S. Application Data

[62] Division of Ser. No. 704,873, Oct. 26, 1970, Pat. No. 3,563,444.

[52] U.S. Cl. ................29/470.3, 156/73, 156/580, 228/2
[51] Int. Cl. ............................................B23k 27/00
[58] Field of Search.....228/2; 29/470.3; 156/73, 580

[56] References Cited

UNITED STATES PATENTS

| | | | |
|---|---|---|---|
| 2,393,883 | 1/1946 | Broderson | 250/71 |
| 3,269,002 | 8/1966 | Hollander et al. | 228/2 |
| 3,337,108 | 8/1967 | Taylor | 228/2 |
| 3,609,854 | 10/1971 | Hasui | 29/470.3 |
| 3,235,158 | 2/1966 | Hollander | 228/2 |

Primary Examiner—John F. Campbell
Assistant Examiner—R. J. Craig
Attorney—Fryer, Tjensvold, Feix, Phillips & Lempio

[57] ABSTRACT

An inertia welding machine having its nondriven tailstock mounted to permit rotation during welding contact between two weld parts and providing a plurality of flywheels for selective rotational association with the tailstock during welding. To provide optimum surface velocity between parts having a small weld interface which would normally result in excessive rotational energy in relation to weld requirements, the nondriven tailstock is permitted to rotate with an associated inertia mass to absorb a portion of the energy.

3 Claims, 2 Drawing Figures

PATENTED OCT 3 1972 3,694,896

INVENTOR.
CALVIN D. LOYD

BY
ATTORNEYS

METHOD OF FRICTION WELDING

CROSS-REFERENCE TO RELATED APPLICATIONS

This is a division of copending application Ser. No. 704,873, filed Oct. 26, 1970, now U.S. Pat. No. 3,563,444.

REFERENCE TO U.S. PATENT

U.S. Pat. No. 3,273,233, issued Sept. 20, 1966 to T. L. Oberle et al. and assigned to the assignee of the present invention, describes in detail a typical method for the joining of weld parts as basically contemplated in the present invention.

BACKGROUND OF THE INVENTION

The well known methods of joining two weld parts by rotating one of the parts and engaging the parts in rubbing engagement to accomplish suitable weld plasticity at their interface require numerous process parameters to be maintained within relatively narrow limits. In particular, a minimum or optimum relative surface velocity is generally required at the weld interface to accomplish an acceptable weld. It is additionally necessary to control the amount of rotational energy imparted to one of the weld parts. Optimization of both of these parameters is particularly difficult with small weld parts or parts having a small weld interface since there is only limited circumferential length in a small weld interface. Accordingly, a very high rotational velocity is required to maintain minimum surface velocity. However, the very high rotational velocity is normally accompanied by proportionally high rotational energy which may be excessive compared to the area of the weld interface.

This problem is readily apparent by consideration of a typical prior art inertia welding machine wherein one of the weld parts is rotated with a suitable inertia mass to an optimum rotational speed. The other weld part is held by a tailstock which is rigidly locked against rotation at least during welding contact between the parts so that rotational energy applied at the weld interface may be closely controlled. Within such a machine, simultaneous optimization of the two parameters of surface velocity and rotational energy limits the minimum part size which may be successfully welded. The size range of parts which can be successfully welded by any such machine is similarly limited.

It is desirable to modify such machines to permit satisfactory joining of small parts. It is further desirable to provide apparatus and a method of operation permitting such machines to handle a wide size range of weld parts for purposes of capital economy and operating versatility.

The present invention achieves these desirable ends by providing a rotatable mounting for the non-driven weld part during welding engagement with another weld part which is rotated at a selected velocity with a resultant rotational energy. A preselected force is applied to the non-driven rotatable weld part to resist its rotation and absorb a preselected portion of the rotational energy imparted to the other weld part. In addition, only a portion of the rotational energy is extracted from the driven spindle system. Thus, a reduced amount of energy is absorbed at the weld interface relative to the driven speed of the other part.

The force applied to the non-driven weld part is preferably variable according to the extent of the weld interface between the parts.

The above advantages and objects will be clarified and additional objects and advantages made apparent from the following description having reference to the accompanying drawings.

Figure 2:
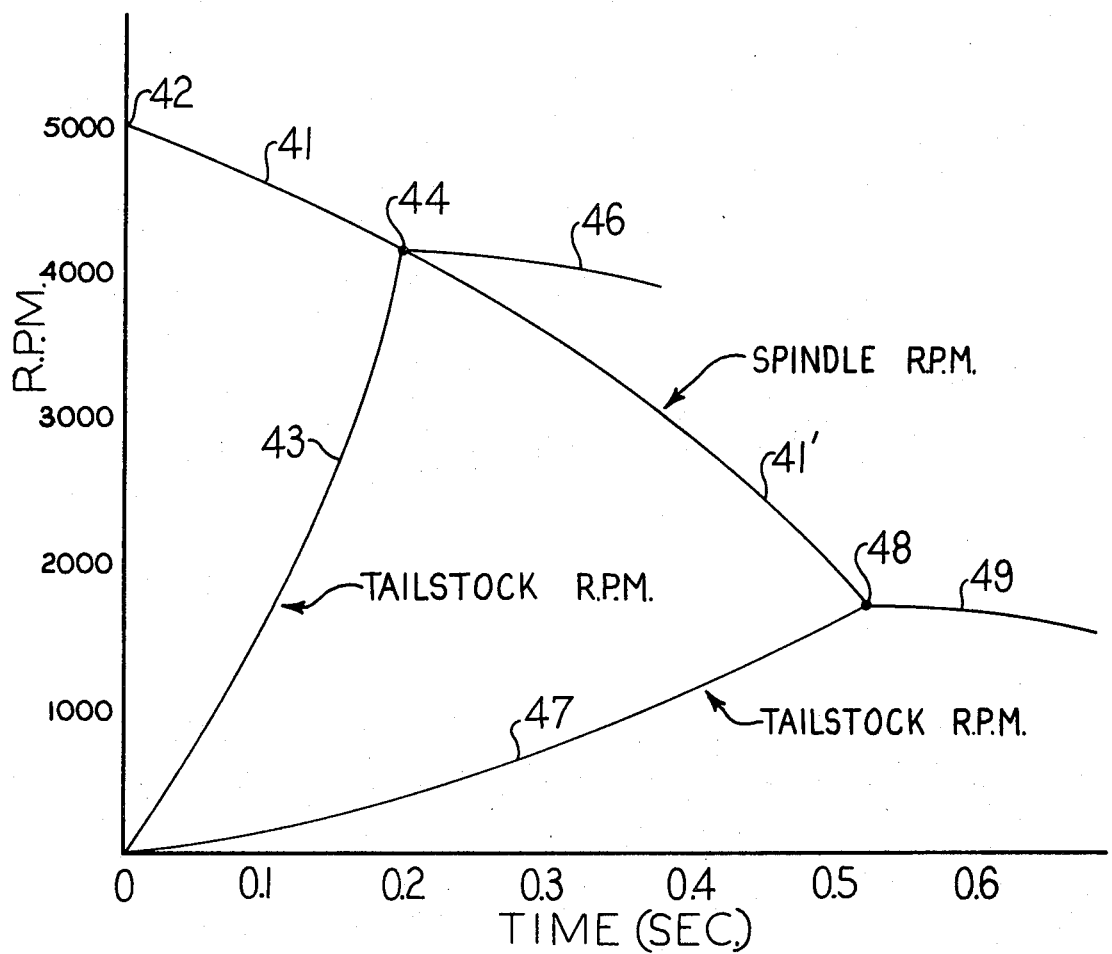

In the drawings:

FIG. 1 is an elevation view, with parts broken away, of a portion of an inertia welding machine incorporating the apparatus of the present invention; and FIG. 2 is a graphical representation of an improved method for accomplishing a weld by such a machine according to the present invention.

The inertia welding machine illustrated in FIG. 1 has a machine frame, partially illustrated at 11, supporting a rotatable spindle 12 which has a chuck 13 for receiving a weld part 14. The spindle 12 is driven in rotation by suitable motor means (not shown). Inertial or rotational energy for accomplishing welding is stored when the spindle and chuck are rotated to a predetermined speed. A tailstock assembly 17 is secured to a main support 18 on the frame and has a chuck 19 for receiving another weld part 21. After the spindle system carrying the first weld part is brought up to its predetermined speed, surfaces 22 and 23 on the respective weld parts 14 and 21 are brought into frictional engagement by means such as described below. The inertial energy in the spindle system is transferred into the weld interface formed by surfaces 22 and 23 to heat these surfaces to suitable plasticity for welding. In the prior art, the tailstock chuck 19 is securely locked against rotation to insure absorption of all of the inertial energy in the spindle 12 and associated rotating parts at the weld interface.

To accomplish welding between relatively small weld parts or a wide size range of parts in a single machine according to the present invention, the tailstock chuck 19 is supported for rotation at 24 during frictional engagement of the weld parts 14 and 21. Suitable means such as a flywheel 25 are associated with the tailstock to apply a selected force for resisting rotation of the tailstock chuck 19 and weld part 21 during frictional engagement between the weld parts. When the rotating weld part 14 is brought into frictional engagement with the other part 21, the non-driven weld part 21, the tailstock chuck 19 and the flywheel 25 are set in rotational motion at a rate principally determined by the inertia mass of the flywheel 25. A portion of the total energy initially stored in the rotating spindle system at the beginning of a weld is used to set the rotatable tailstock parts in motion. A second portion goes into the weld interface for making the weld, while the remaining portion is still available in the rotating spindle after the weld is completed. Thus, when the weld parts are small or relatively undersize in relation to the components of the weld machine, the rotational speed of the spindle 12 is selected to optimize relative surface velocity between the weld parts. This selected speed stores a quantity of inertial energy in the spindle system which would be substantially in excess of the optimum energy range for suitable welding of quite small parts. However, in the present invention, a predetermined portion of the inertial energy from the spindle system is absorbed for setting the tailstock flywheel 25 in motion so that only the optimum inertial energy for welding is actually absorbed at the weld interface.

The rotational mounting 24 for the tailstock assembly 17 is provided by a member 26 secured to the support 18 and defining a bore 27 in a axial alignment with the spindle 12. A piston 28 extending axially from the rotatable tailstock assembly is disposed for rotation in the bore 27. The piston defines a closed chamber 29 in the bore which is filled with a suitable fluid or lubricant such as oil or grease to provide a hydrostatic bearing for supporting and positioning the piston. Lubricant is fed to the chamber 29 through a passage 31 in the housing 26. Suitable valve means 32 maintains lubricant in the chamber during operation. A bushing or bearing 33 is disposed in the end of the bore 27 to provide a smooth, lubricated surface for supporting the rotating piston. A plurality of annular grooves 34 are formed on the piston to maintain a supply of lubricant between the piston and the surfaces of the bushing or bore during rotation of the tailstock.

In conventional inertia welding machines, either the spindle assembly or tailstock assembly is mounted for axial motion to permit urging of the two weld parts into suitable frictional engagement. To simplify the present welding machine, the rotational mounting 24 is also a suitable means for axially shifting the tailstock assembly toward the spindle. Since the piston is free for axial motion in the bore 27, additional lubricant pumped into the chamber 29 (from suitable means not shown) would urge the tailstock assembly leftward and cause engagement of the two weld parts.

The single flywheel 25 associated for rotation with the tailstock chuck 19, as illustrated in FIG. 1, would provide fixed resistance to rotation. However, it is desirable that the rotation resisting force or inertia mass associated with the chuck 19 be variable to make the machine readily adaptable for handling a variety of weld parts with different sizes of weld interfaces. To accomplish such versatility, a plurality of flywheels are provided including flywheels 36 and 37 as well as flywheel 25. Although three flywheels are illustrated and described, any number could be employed to accomplish desired inertia mass variations. The flywheels are each tapped and bored, as at 38, so that they may all be secured upon the non-rotating member 26. One or more of the flywheels may be transferred to the rotatable tailstock assembly to provide the desired rotatable inertia mass.

The number and mass of flywheels to be connected to the rotatable tailstock is determined by the amount of energy to be absorbed from the spindle system during welding to provide suitable heating at the weld interface As described above, this permits the initial weld speed of the spindle 12 to be determined according to the optimum initial surface velocity at the weld interface. For example, as the diametral size of weld parts is decreased and the area of the weld interface is decreased, initial spindle velocity is increased to maintain optimum surface velocity at the weld interface. This increased spindle velocity results in storage of an increased amount of inertial energy in the spindle system while the actual energy requirement for accomplishing the weld is decreased according to the diminished area of the weld interface. Thus, when very small weld parts are to be joined, all of the flywheels 25, 36 and 37 are removed from the rotating tailstock and mounted on the non-rotating member 26. The inertia mass of the rotating tailstock then provides limited resistance to rotation. As the rotating weld part 14 is engaged with the initially stationary but rotatable weld part 21, the weld part 21, tailstock chuck 19 and rotating tailstock assembly 17 is rapidly accelerated in rotational motion. When its rotational speed equals that of the spindle assembly, the weld in completed. However, because of the rapid acceleration of the tailstock assembly, only a limited portion of the inertial energy from the spindle system is absorbed at the weld interface. Part of the inertial energy remains in the spindle 12 since it is still rotating at the completion of the weld. The remainder of the inertial energy extracted from the spindle system (excluding that used to make the weld) is absorbed by the rotatable tailstock assembly for the purpose of setting it in rotation.

As larger weld parts are employed, it is desirable to extract less inertial energy from the spindle system into the rotatable tailstock assembly so that additional energy is absorbed at the weld interface. The inertial resistance of the tailstock is incrementally increased by fixing one or more of the flywheels 25, 36 and 37 for rotation with the tailstock. The amount of energy then transferred to the weld interface is increased in at least two different manners. The increased inertial mass on the tailstock provides increased rotational resistance. Thus, the rotational acceleration of the tailstock is decreased so that it absorbs less inertial energy from the spindle system. Additionally, the spindle assembly must be decelerated to a lower speed before the rotational speeds of the weld parts are equivalent and the weld is completed. Both of these effects tend to increase the remaining inertial energy which must necessarily be absorbed at the weld interface. The energy actually absorbed or consumed at the weld interface is thus seen as the difference between the inertial energy stored in the spindle assembly before welding and the energy available in the rotating members, both the spindle and tailstock assemblies, after completion of the weld. As more and more inertial mass is associated with the rotatable tailstock, that assembly tends to assume the nature of a stationary or non-rotatable tailstock whereupon substantially all of the inertial energy originally stored in the spindle assembly is absorbed at the weld interface.

The above described variable relationships are graphically illustrated in FIG. 2 wherein speed of the various assemblies is plotted according to elapsed time. Point 42 represents the beginning of the weld while trace 41 represents decreasing speed of the spindle system after initial contact is made between the weld parts. Trace 43 represents increasing speed of the initially stationary but rotatable tailstock assembly with a relatively small inertial mass, for example, with only the flywheel 25 mounted on the tailstock. The two assemblies reach a common rotational speed at point 44 and then exhibit a common decreasing speed (due to friction in the bearings) as represented by trace 46. When the inertial mass of the tailstock assembly is increased by additional flywheels, the decreasing speed of the spindle is further represented by trace 41' while the speed of the tailstock assembly increases at a slower rate as represented by a trace 47. The spindle and tailstock assemblies reach a common rotational speed at point 48 which represents weld completion and then decelerate together along trace 49. The decrease of spindle speed along traces 41 and 41' indicates the amount of inertial energy removed from the spindle assembly during welding. The increase of tailstock speed along trace 43 or 47 is indicative of the amount of inertial energy absorbed by the tailstock assembly during welding. By considering terminal speed at point 44 (with reduced tailstock inertial mass) relative to terminal speed at point 48 (with increased inertial mass), the nature of energy transfer is readily apparent. Energy absorbed at the weld interface is relatively small with reduced tail-stock mass since the decrease of spindle speed is small while the increase of tailstock speed is relatively large at terminal point 44. On the other hand, energy absorbed at the weld interface is increased with increasing tailstock mass. This is illustrated by terminal speed 48 in that the decrease of spindle speed is substantially larger and the increase of tailstock speed substantially smaller relative to terminal speed 44. Thus, the present invention provides apparatus and a method in inertia welding machines permitting adaptability for use with smaller weld parts and versatility for use with a wider size range of weld parts.

Since the spindle and tailstock assemblies are in rotation at completion of the weld, some means is necessary for stopping them to permit removal of the joined weld parts. One means for stopping the rotating members is a brake 51 associated with the spindle (see FIG. 1).

It is apparent that numerous modifications and variations are possible within the invention as set forth herein. In particular, the invention is described with one or more of the flywheels 25, 36 and 37 or merely the inertial mass of the tailstock assembly contemplated as means for resisting rotation of the tailstock assembly. Thus, although the inertial mass of the tailstock, as described, is variable only in substantial increments by mechanically adding or removing flywheels from the tailstock, the invention also contemplates means for substantially continuous variations of rotational resistance for the tailstock. Such a goal could be reached by a large number of lightweight flywheels. Although the use of flywheels is desirable from a standpoint of simplicity, other means could also be used. For example, such means could take the form of apparatus for applying a remotely variable hydraulic, electrical or even mechanical load to resist rotation of the tailstock. Such means would be doubly advantageous since the remotely variable means could also be employed to accomplish or assist in accomplishing braking after completion of the weld.

What is claimed is:

1. In a method of welding together two metal parts, the steps comprising rotating one part with the parts out of contact to a suitable initial speed at which to accomplish welding of the parts while coupling the one part for rotation with a rotating inertia mass to provide sufficient inertial energy in the rotating one part and associated inertia mass for supplying excessive heating energy relative to the weld requirements of the parts, bringing the parts into frictional contact under pressure to heat their interface to a weldable condition with the speed of rotation, supporting the other part in a manner to permit it to rotate during the period of welding contact between the parts and associating an inertia mass for rotation with the other part to selectively regulate the amount of energy absorbed at the weld interface relative to the rotational speed of the one part.

2. The method of claim 1 wherein the preselected force applied to the other part is variable according to the size of the weld interface between the parts.

3. The method of claim 1 wherein said initial speed of the one weld part is selected to provide optimum initial relative surface velocity between the weld parts.

* * * * *